United States Patent [19]

Davis

[11] Patent Number: 4,597,862
[45] Date of Patent: Jul. 1, 1986

[54] FILTER PRESS PLATE SEPARATION DEVICES

[75] Inventor: Alan E. Davis, Stoke-on-Trent, England

[73] Assignee: Edwards & Jones Limited, Stoke-on-Trent, England

[21] Appl. No.: 587,991

[22] Filed: Mar. 9, 1984

[30] Foreign Application Priority Data

Mar. 11, 1983 [GB] United Kingdom ............... 8306809

[51] Int. Cl.$^4$ .................... B01D 25/34; B01D 25/22
[52] U.S. Cl. .................................. 210/106; 210/143; 210/225; 210/231
[58] Field of Search ............... 210/224–231, 210/106, 143

[56] References Cited

U.S. PATENT DOCUMENTS

| 3,878,102 | 4/1975 | Busse et al. | 210/230 |
|---|---|---|---|
| 4,076,033 | 2/1978 | Busse et al. | 210/230 |
| 4,129,137 | 12/1978 | Kurita et al. | 210/230 |
| 4,137,167 | 1/1979 | Kenyon et al. | 210/230 |
| 4,139,091 | 2/1979 | Busse et al. | 198/732 |
| 4,171,266 | 10/1979 | Kurita et al. | 210/230 |
| 4,181,615 | 1/1980 | Wilms | 210/230 |
| 4,197,199 | 4/1980 | Gribbin et al. | 210/143 |
| 4,201,672 | 5/1980 | Kenyon | 210/225 |
| 4,265,749 | 5/1981 | Busse et al. | 210/230 |
| 4,359,385 | 11/1982 | Krivec | 210/230 |
| 4,362,616 | 12/1982 | Gehrmann et al. | 210/225 |
| 4,446,020 | 5/1984 | Kurita | 100/198 |

FOREIGN PATENT DOCUMENTS

| 1812901 | 8/1970 | Fed. Rep. of Germany | 210/230 |
|---|---|---|---|
| 2382917 | 11/1978 | France | 210/225 |
| 2040716A | 9/1980 | United Kingdom | 210/230 |

Primary Examiner—Barry S. Richman
Assistant Examiner—Titus B. Ledbetter
Attorney, Agent, or Firm—Robert W. Fiddler

[57] ABSTRACT

A filter press tray separating device has a latch and a pawl for engaging neighboring plates to be separated from the end of a pack of plates and means for separating the pawl from the latch while they engage respectively the end and next-to-end plates of the pack so that the separating force exerted by the pawl on the end plate is matched by an opposite reactive force exerted by the latch on the next-to-end plate, the device including means for disengaging the latch and pawl when a plate has been separated and for repositioning it at the next pair of plates to be separated. The latch and the pawl are both carried by a movable carriage means that moves along a stationary frame that extends along the longitudinal axis of the pack of plates.

3 Claims, 21 Drawing Figures

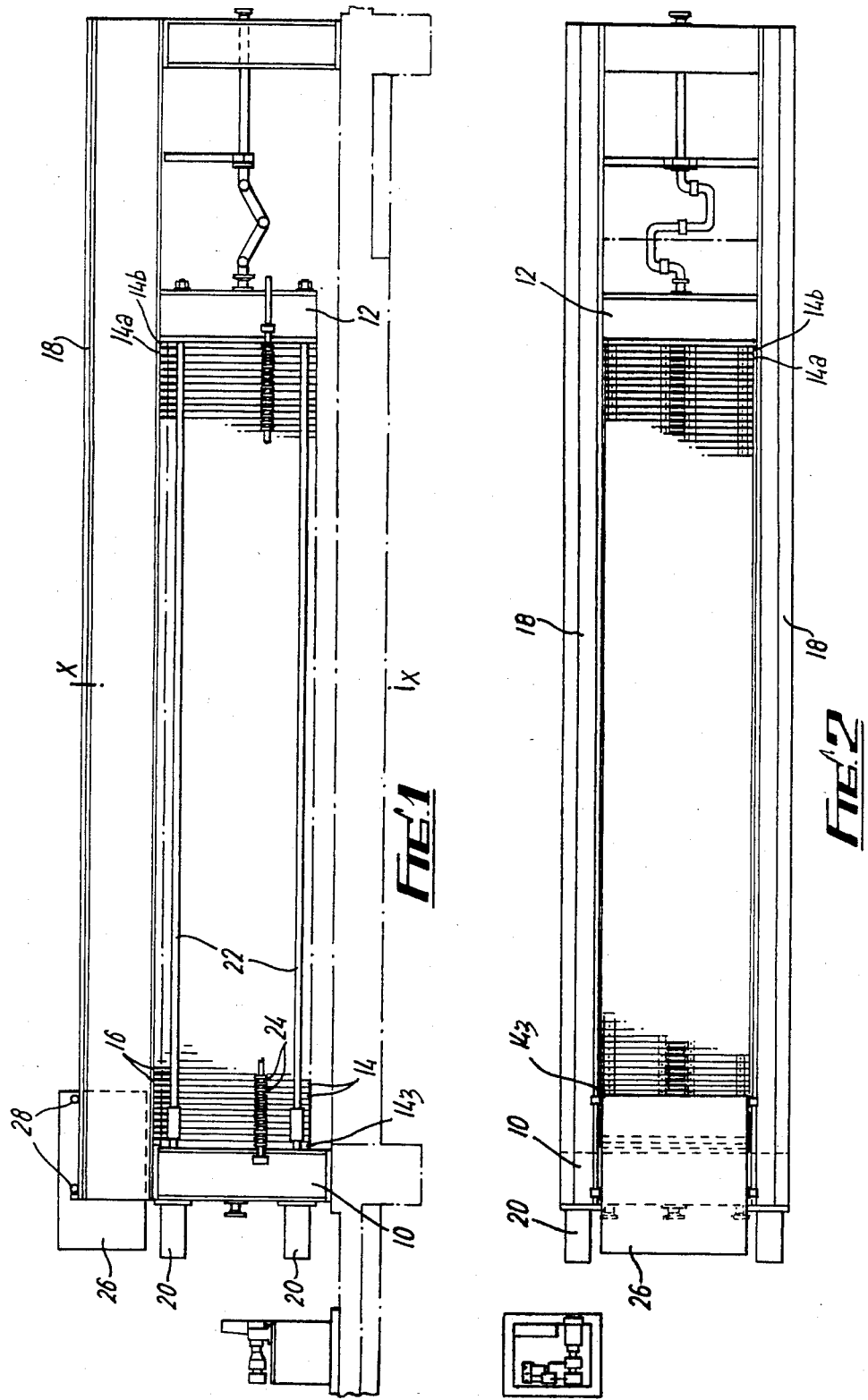

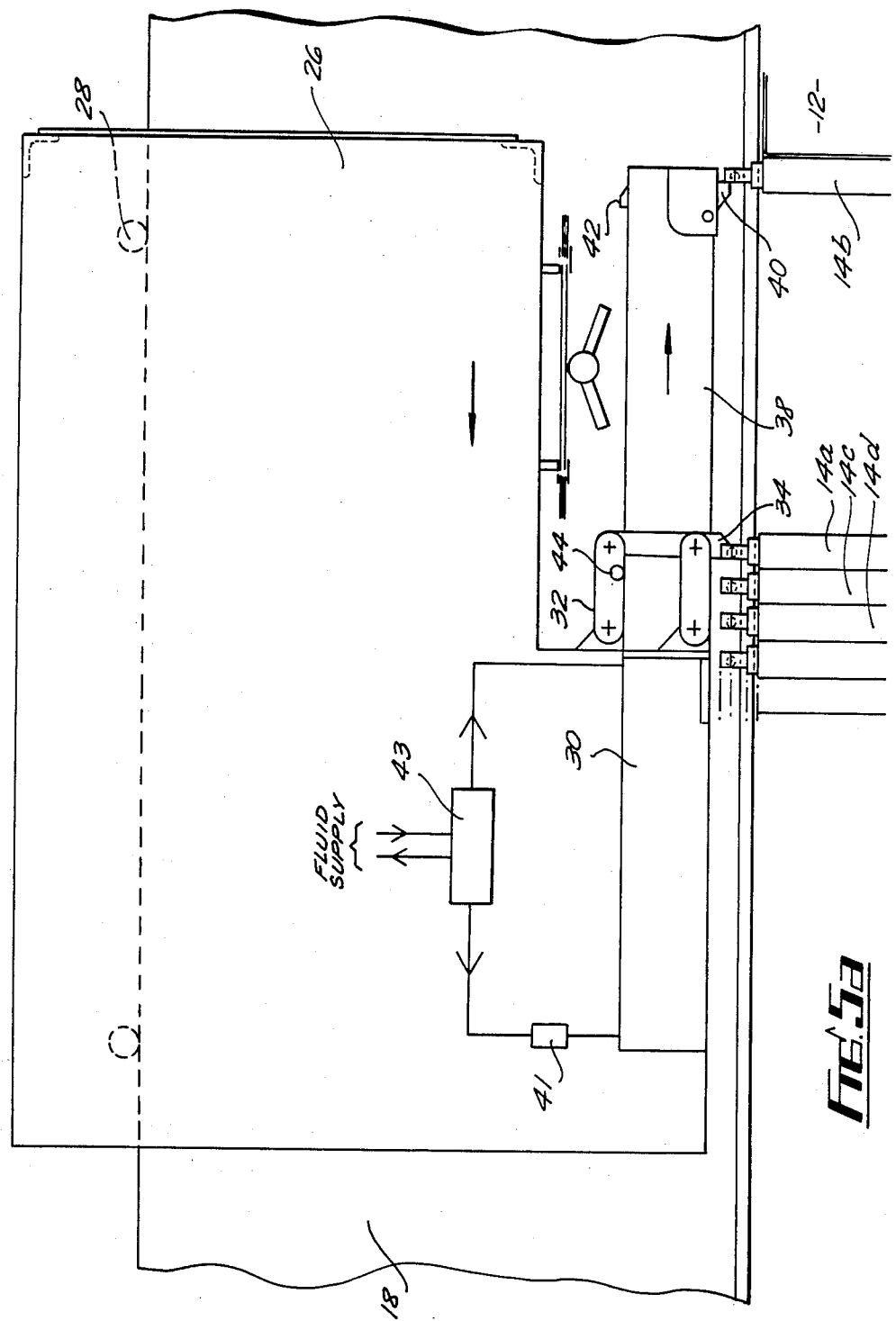

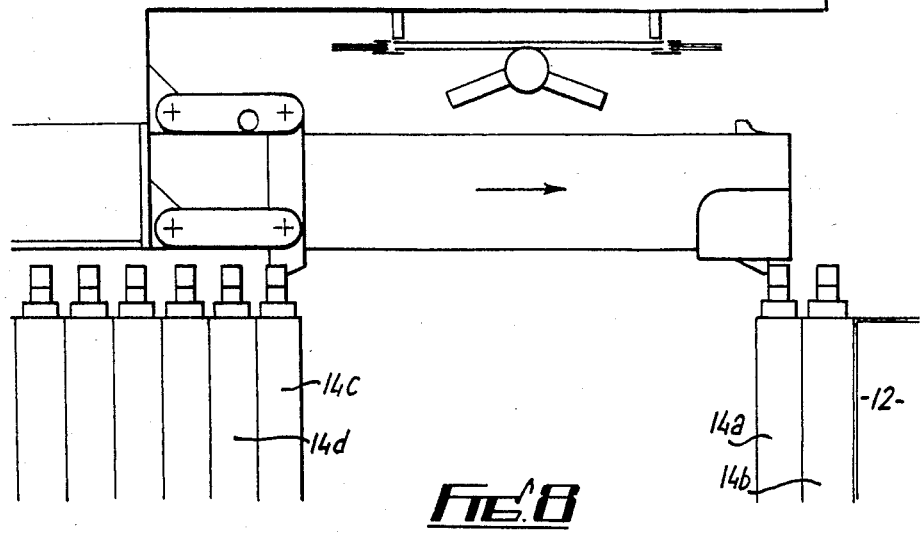
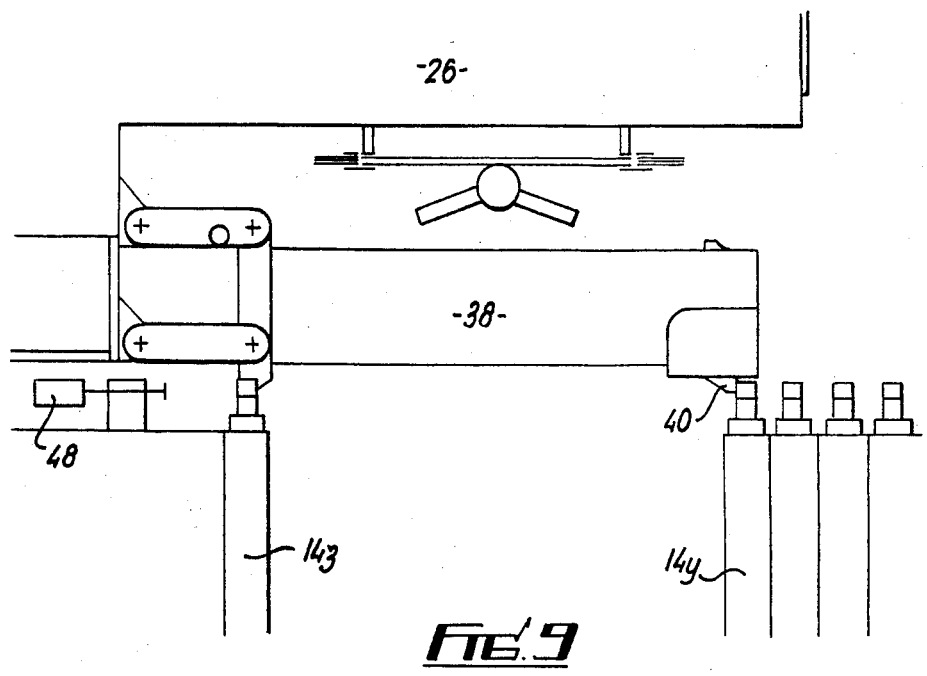

FILTER PRESS PLATE SEPARATION DEVICES

The present invention concerns improvements in or relating to filter press plate separation devices.

Filter presses normally comprise a pack of plates arranged, with the axis of the pack horizontal, between a fixed and a movable press end, each plate with the exception of the outermost trays of the pack, having depressions formed in each side so that when the plates are pressed together cavities are defined between each tray. Normally each side of the filter plate is covered with a sheet of filtering medium, for example a filter cloth, so that when the plates are pressed into a compact pack filtrate can be supplied to the cavities to allow filtration to take place through the filter cloths. After the filtration step has been completed the movable end of the press carrying the end-most plate is moved away from the remainder of the pack to allow the filter cake which has accumulated in the end-most filter chamber to be removed. The plates of the pack can then be moved one at a time relative to their neighbours so that filter cake which has accumulated therebetween can be removed. The pack of plates is normally supported by a central overhead beam of by a pair of beams arranged alongside the plates so that each plate can slide over the support beam or beams relative to its neighbours.

Various mechanisms have been provided in the past for moving the plates relative to each other and have comprised, for example, pawl arrangements moving along the side of the pack and successively engaging pins projecting from individual plates. These prior plate moving arrangements have exhibited a major drawback in that as a result of the filtering operation there is a tendency for plates to stick together so that when certain existing plate moving arrangements have operated on the outer plate of a pack of plates it has been found that it is not the outer plate which separates from its neighbour but the outer plate together with one or more other plates.

It is an object of the present invention to obviate or mitigate this disadvantage.

According to the present invention there is provided a filter press tray separating device comprising first and second members adapted to engage a pair of neighbouring plates at one end of a pack of plates to be separated, means for moving said members apart whereby the plate engaged by said first member is urged towards the remaining plates of the pack while the plate engaged by the second member is separated from said other plate and means for disengaging said members and moving the device into an operative position at the next pair of plates to be separated.

Preferably the device is mounted on a carriage for movement over the top of the pack of filter plates. Preferably the said first member comprises a latch movably mounted on the device for movement away from and towards the position in which it engages a plate. Preferably the mounting of said latch comprises a parallelogram linkage.

Preferably the second member is a pawl pivotally mounted on a member mounted for reciprocation on the carriage relative to said first member. The arm may have a lift cam on its surface co-operable with a follower on the parallelogram linkage of the first member to cause the disengagement of said member. Said pawl is preferably pivotally mounted on said reciprocable member such that as the said member is moved over the pack of plates in a direction towards the end of the pack it pivots away from its plate engagement position. The pawl has a leading face which, when the reciprocable member moves in a direction away from the end of the pack of filter plates comes into engagement with a filter plate.

Preferably the reciprocable member and drive means are provided for moving the carriage from one end of the pack after it has separated all the plates of the pack to its starting position in which the first and second members are positioned between a half filter plate attached to the travelling end of the press and the first full filter plate after said half plate has been moved away from said first full filter plate by movement of the press end.

Preferably hydraulic pressure sensing means and fluid supply reversing means are provided in the hydraulic supply for piston and cylinder device such that when it has advanced to such a position that the pawl pushes a separated plate against the most recently separated plate the increased pressure is sensed and the direction of movement of the reciprocable member is reversed, a limit switch being provided to detect the position of the member when the pawl has moved over the outer plate of the pack of remaining plates the switch causing the fluid supply means to reverse so that the direction of movement of the reciprocable member is again reversed, the latch engagement means on the reciprocable member moving the latch out of engagement with the outer plate of the pack as the carriage moves in the direction of the end of the pack so that the latch is moved into engagement with the next-to-outer plate of the remaining pack of plates and the outer plate of the pack to be positively separated from the remainder of the pack is pushed away from it by the pawl.

Preferably a further limit switch is provided on the fixed end of the filter press adjacent to the last plate of the pack so that as the reciprocable member is advancing the carriage retreats to actuate the further limit switch which starts the carriage drive means to return it to its starting position.

Preferably the carriage supports also a spray device and a mechanism for lowering the device between separated plates to wash the filter cloths thereon. It is advantageous that the mechanism for lowering the spray device operates when the plate is held in its fully separated position. The spray device may include brush means to wipe the cloth as it travels thereover.

According to another aspect of the present invention there is provided a filter press including a fixed and a movable end member and a pack of filter plates mounted therebetween said filter plates being supported from their upper corners on a pair of beams arranged externally of the pack of plates.

Preferably an extension from said beams supports a plate separation and moving device of the type described in any one of the preceding seven paragraphs.

Embodiments of the present invention will now be described by way of example only with reference to the accompanying drawings in which:

FIGS. 1 and 2 show a general arrangement elevation and a plan respectively of a plate filter press;

FIGS. 4 to 11 show diagrammatically a plate separating and moving device of the filter press shown in FIGS. 1 to 3, at various stages during its operation;

Figure 3:
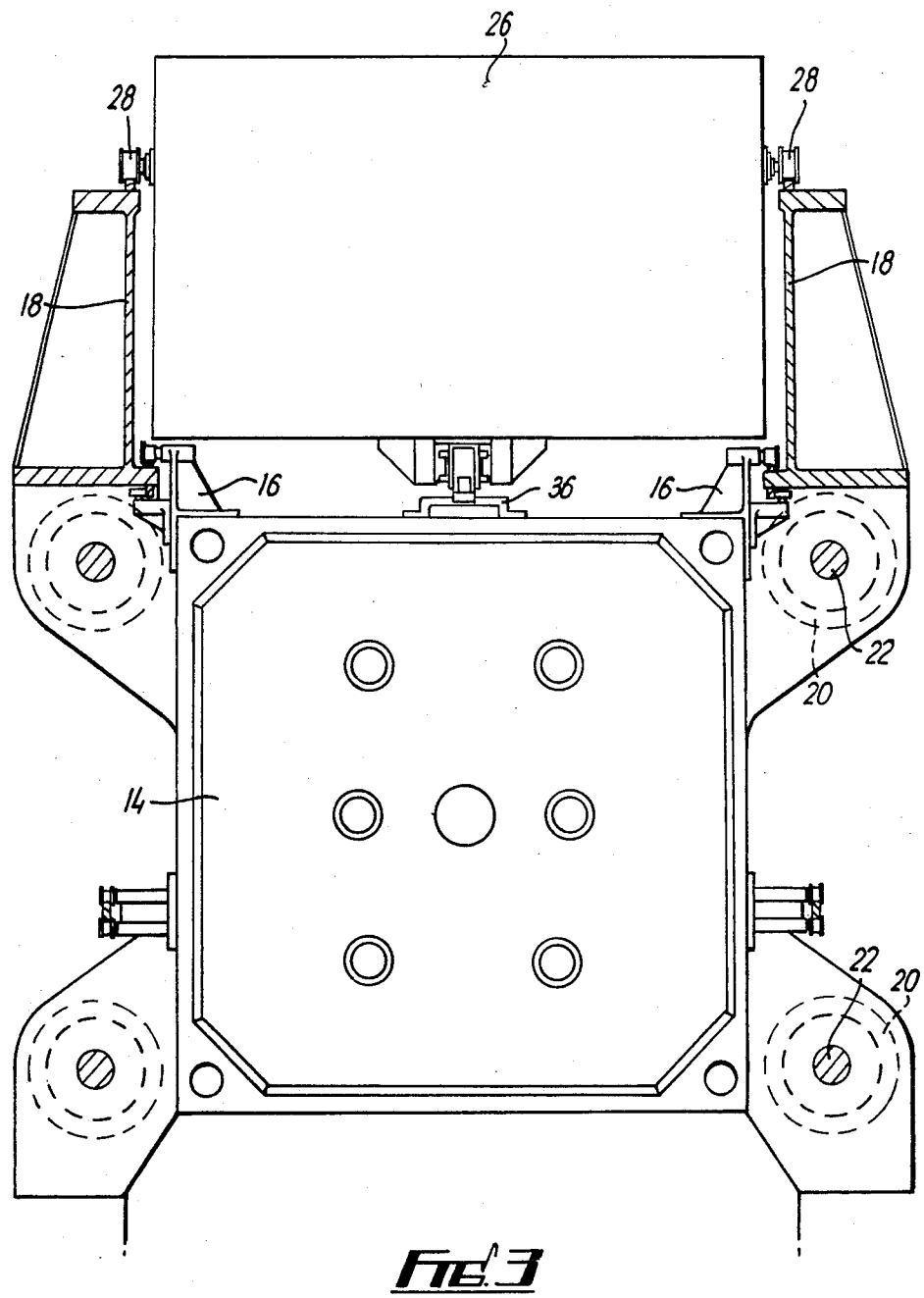
FIG. 3 shows a sectional elevation of the press taken on the line X—X of FIG. 1.

A plate filter press comprises a fixed feed and 10, a movable end 12 and a pack of filter plates 14 sandwiched therebetween and supported by their upper corners 16 on a stationary frame including a pair of spaced overhead support beams 18, the beams 18, as can be seen from FIG. 3, being located externally of the pack of plates. The filter press is provided with the hydraulic cylinders 20, tension rods 22 and plate swing restraint roller arrangements 24 normally associated with presses of this nature and as these components do not form part of the present invention they will not be described here in detail.

The filter press operates in the normal manner, that is the cavities defined between adjacent filter plates 14, which are lined with filter cloths, are supplied with slurry to be filtered and when the filtering process has been completed a residue of filter cake occupies the chambers. To prepare the filter press for use again it is necessary to remove this filter cake and this operation is commenced by first operating the hydraulic cylinders 20 to move the moving end 12 of the press to the right hand side, as viewed in FIGS. 1 and 2, away from the first full plate 14a of the pack, a half plate 14b fixed to the moving end 12 being moved away from the plate 14a with the moving end. A further half plate 14z is attached to the fixed end 10 of the press.

A plate separation and moving device 26 is provided for moving the outer plate of the remaining pack away from the pack into position against an increasing pack of emptied plates forming against the moving end 12 of the press. The construction and method of operation of said device can be best seen from FIGS. 4 to 11.

Figure 4:
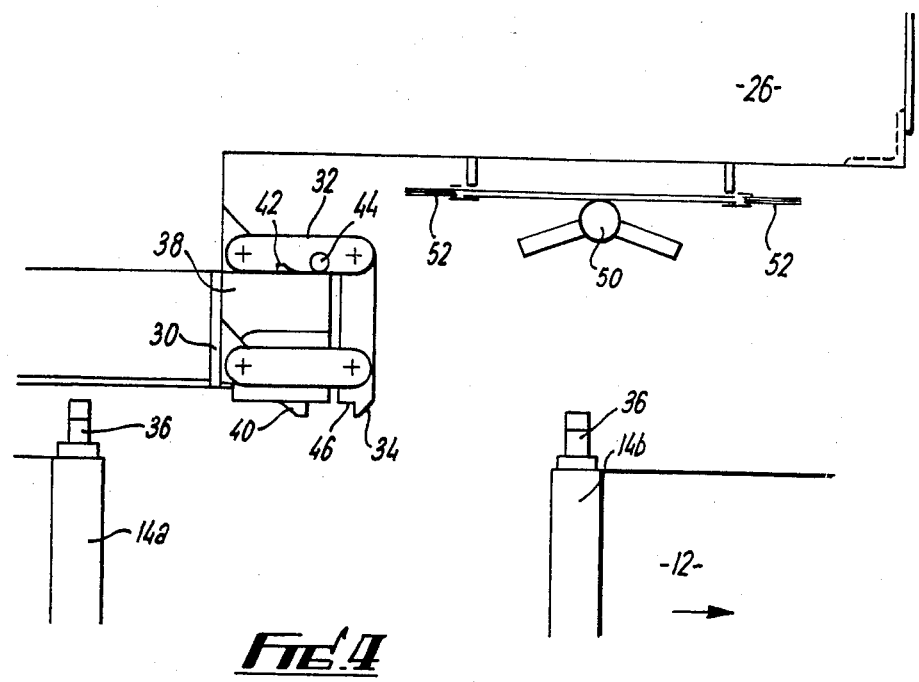

The device is supported by wheels 28 on the overhead support beams 18 and means are provided for driving it from the fixed feed end 10 of the press to the position at the moving end 12 shown in FIG. 4. Fixed to the carriage 30 of the device on a vertical surface facing the moving end of the press there is provided a first member comprising a pivoted parallelogram linkage 32 which incorporates a latch 34 protruding below the carriage 30 in the path of handles 36 fixed to the upper edge of each plate at the centre thereof. The latch 34 comprises two spaced apart members (FIG. 3) and an arm 38 is mounted on the carriage 30 for reciprocation between the spaced latches 34. As can be more clearly seen in FIG. 5, a second member in the form of a pivotally mounted pawl 40 is mounted to the underside of the free end of the arm, the pawl being so arranged that its abutment faces towards the moving end of the press. On the upper surface of the arm near its free end there is provided a lift cam 42 adapted for co-operation with followers 44 on the parallelogram linkage 32.

Figure 5:
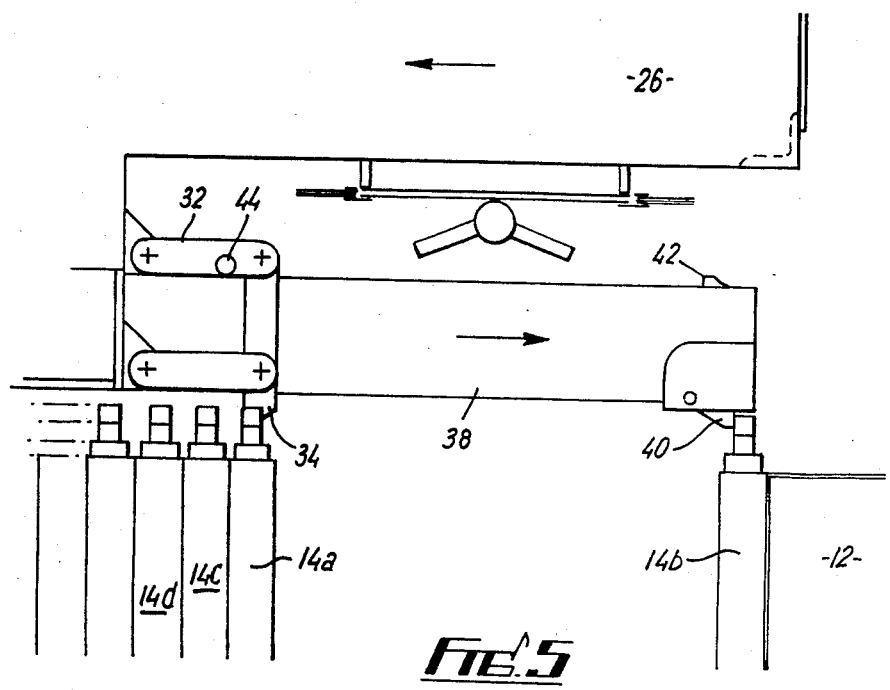

An electric motor is provided to drive a hydraulic pump supplying pressure fluid to a ram for moving the arm 38 relative to the carriage 30 and when the cylinders 20 of the filter press have been operated to move the press moving end and the half plate 14b it carries away from the first plate 14a of the pack of plates, the motor is started up and after a delay during which it is run up to speed hydraulic fluid is fed to the ram to move the arm 30 such that it advances until the pawl 40 engages the handle 36 of the half plate 14b. Continued movement of the ram causes the arm to advance relative to the carriage 30 but as the free end of the arm is restrained against further movement by engagement of the pawl 40 with the handle 36 of the half plate 14b this continued movement cause the device 26 to move on its wheels 28 over the overhead beams 18 until this movement is arrested by engagement of the abutment face 46 of the latch 34 (this face facing the fixed end of the press) with the handle 36 of the first plate 14a of the pack. This condition is illustrated in FIGS. 5 and 5a and at this stage a build up of pressure in the ram driving the arm 38 is detected by a sensor 41 resulting in reversal of the ram by reversing means 43 to cause it to move to the left as viewed in FIG. 5, this movement continuing until the arm reaches the position shown in FIG. 6 which occurs after the pawl 40 has been pivoted upwardly on abutment with the handles 36 of plate 14a and the neighbouring plate 14c. When the arm reaches the position shown in FIG. 6, that is with the pawl 40 on the press fixed end side of the first plate 14a, a limit switch causes the arm actuating ram to reverse its direction of movement so that once again it moves towards the moving end 12 of the press. It can be seen from FIG. 7 that as this advance movement continues the lift cam 42 engages the followers 44 of the parallelogram linkage 32 to lift the latch 34 out of the path of travel of the plate 14a which, on further advance of the arm 38 is moved towards the half plate 14b. As soon as the lift cam 42 has cleared the follower 44 the latch 34 drops to its normal position, there is a reactive movement of the carriage towards the fixed press end 10 and the latch engages the handle 36 of the next following plate 14c such that there is a positive mechanical separation movement between the latch 34 and the pawl 40, this causing the plate 14a to be positively separated from the plate 14c and the remaining plates of the pack and to be moved towards the moving half plate 14b. When the plate 14a is moved against the half plate 14b the condition described with reference to FIG. 5 is reached and the operation can then continue for the successive plates 14b . . . 14y of the pack.

Plate 14y is the last full plate of the pack and is arranged next to a half plate 14z fixed to the press fixed end 10 (FIG. 9). This plate 14y is moved by the arm 38 and its pawl 40 against the pack of emptied plates. When the arm 38 has completed its retraction movement and begins to advance to push the half plate 14z towards the travelling end, as this plate is fixed no movement takes place but rather a movement of the carriage 26 towards the fixed end occurs and continues until the latch 34 abuts a limit switch 48 fixed on the fixed end 10, the limit switch combining with a fixed stop. The limit switch 48 gives a signal which causes the arm 38 to fully retract, the latch and pawl to be lifted mechanically and the power drive of the carriage wheels 28 to be engaged such that the carriage is moved to the moving end of the machine to occupy the position shown in FIG. 4 ready for the next cycle to begin. At this position a limit switch causes the drive to cease.

Figure 6:
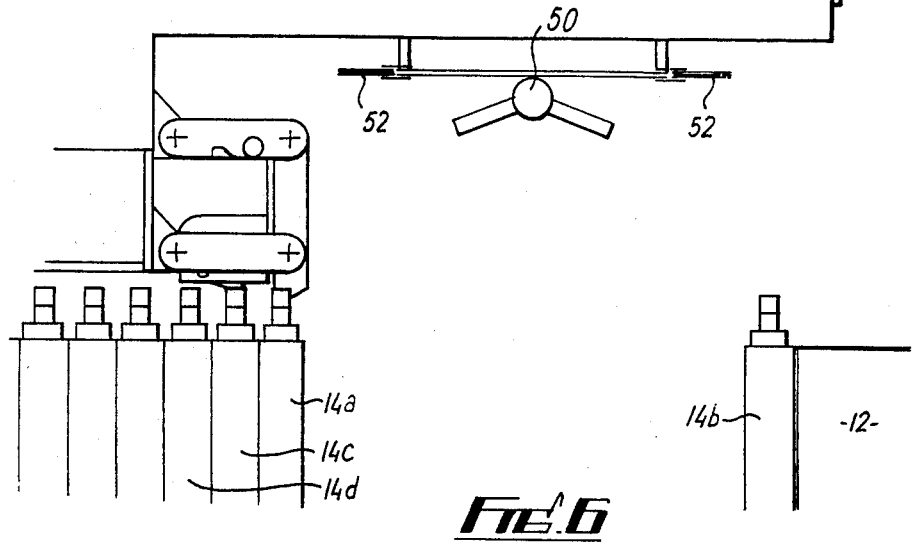
Figure 7:
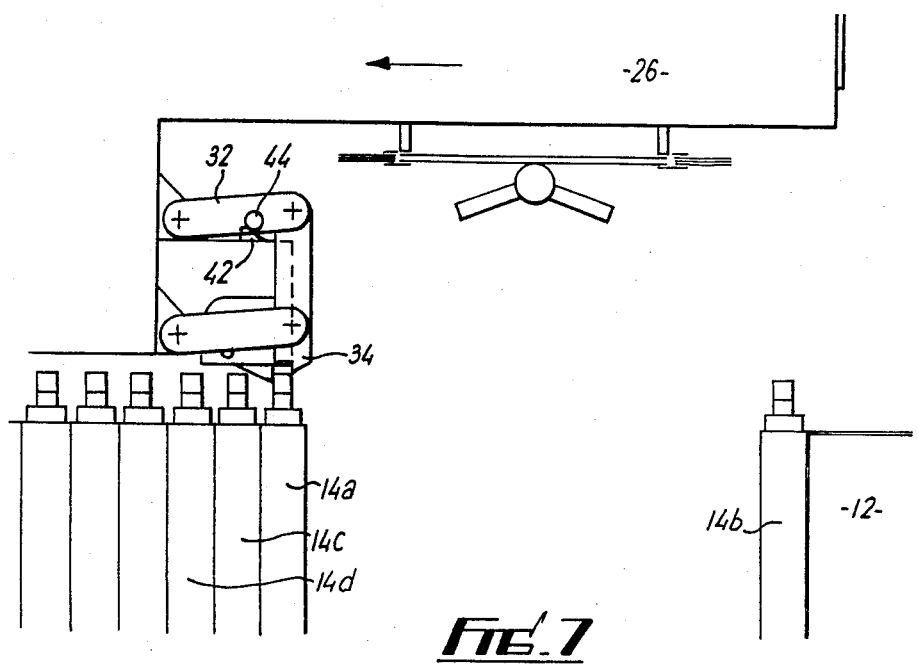
Figure 10:
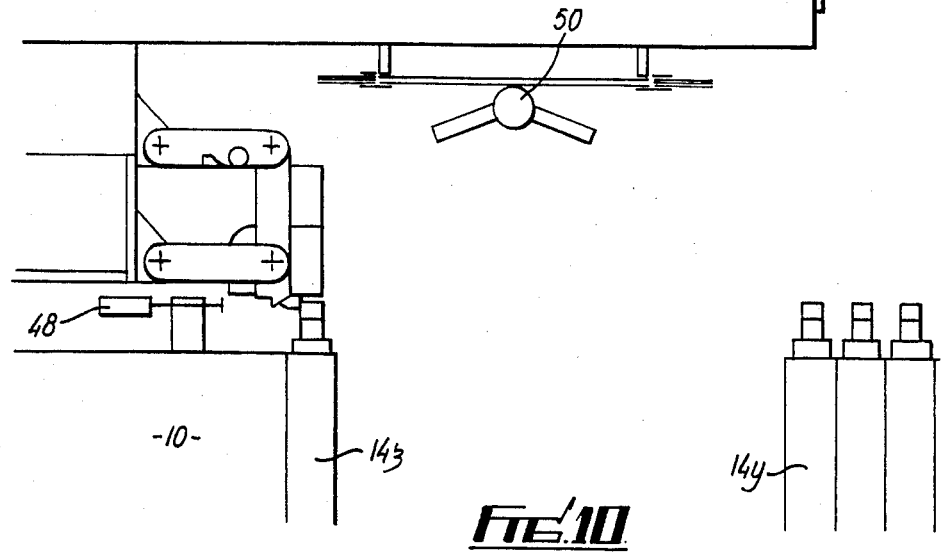
Figure 11:
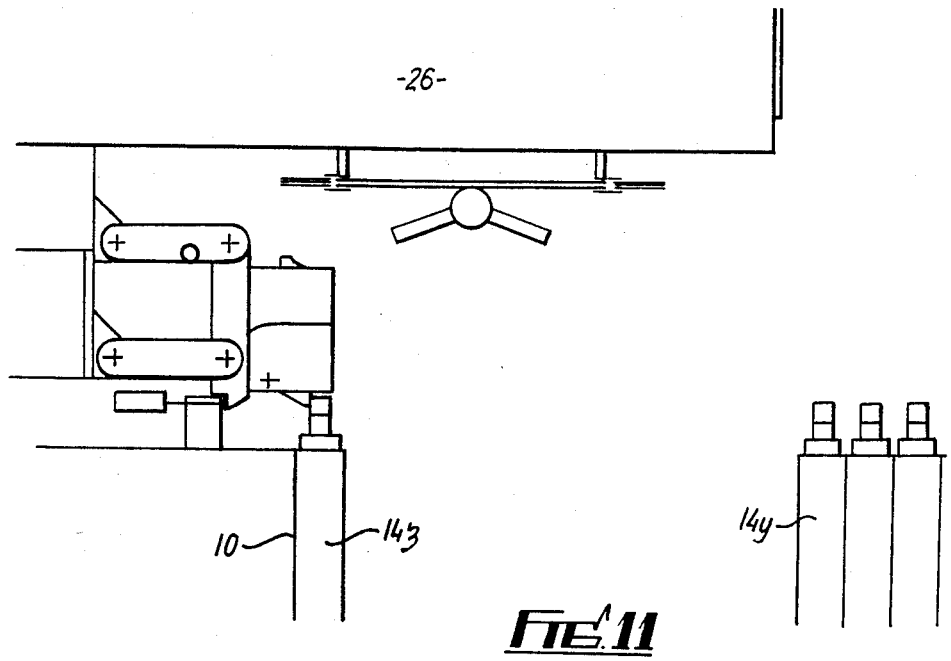

It will be realised that by following the sequence of operations described with reference to FIGS. 4 to 11 the entire pack of plates is separated one by one and finishes up resting against the travelling end of the press. At each separation stage there is a gap between the plate which has just been moved and the plate which is about to be moved and the provision of this gap may be utilised by a cloth spraying device 50 (FIG. 6). When the arm 38 is in its retracted position it is retained there to allow the spray head 50 to be lowered to wash the filter cloths. The spray head may be provided with flexible bristle brushes 52 which brush the cloths and prevent spray escaping upwardly over the tops of the plates.

The positioning of the overhead beams 18 to each side of the pack of filter plates does not impede the spray head.

Various modifications can be made without departing from the scope of the invention as described above, for example two arrrangements of latches, arms and pawls may be provided on each side of the centre line of the central axis of the pack. Different means may be provided for mounting and operating the latches, pawls etc. and the control means for monitoring and actuating the various steps of the separation arrangement can be substituted by any suitable control means.

In a filter press where the arrangement of components is such that a tray separating device of the type described above cannot be used above the pack of plates, a modified device can be arranged on one side of the pack. More advantageously two devices can be employed, one on either side of the pack, the devices being linked so that they operate in synchronism.

A tray separating device of this nature is shown in FIGS. 12 to 20. The modified filter press comprises a fixed feed end 110 (FIGS. 17, 18 and 19) a movable end 112 and a pack of filter plates 114 sandwiched therebetween and supported at their sides by a pair of spaced side bars 118 which are located externally of the pack of plates and run along each side of the pack. As in the embodiment described with reference to FIGS. 1 to 11, the filter press is provided with a hydraulic cylinder, tension rods and other arrangements normally associated with presses of this nature and as these do not form part of the present invention they are not shown in FIGS. 12 to 20 and will not be described. the filter press of the modification operates in a manner similar to the filter press described with reference to FIGS. 1 to 11 and has a filter cloth spraying device 150 which operates in the manner of the device 50 described above.

Figure 12:
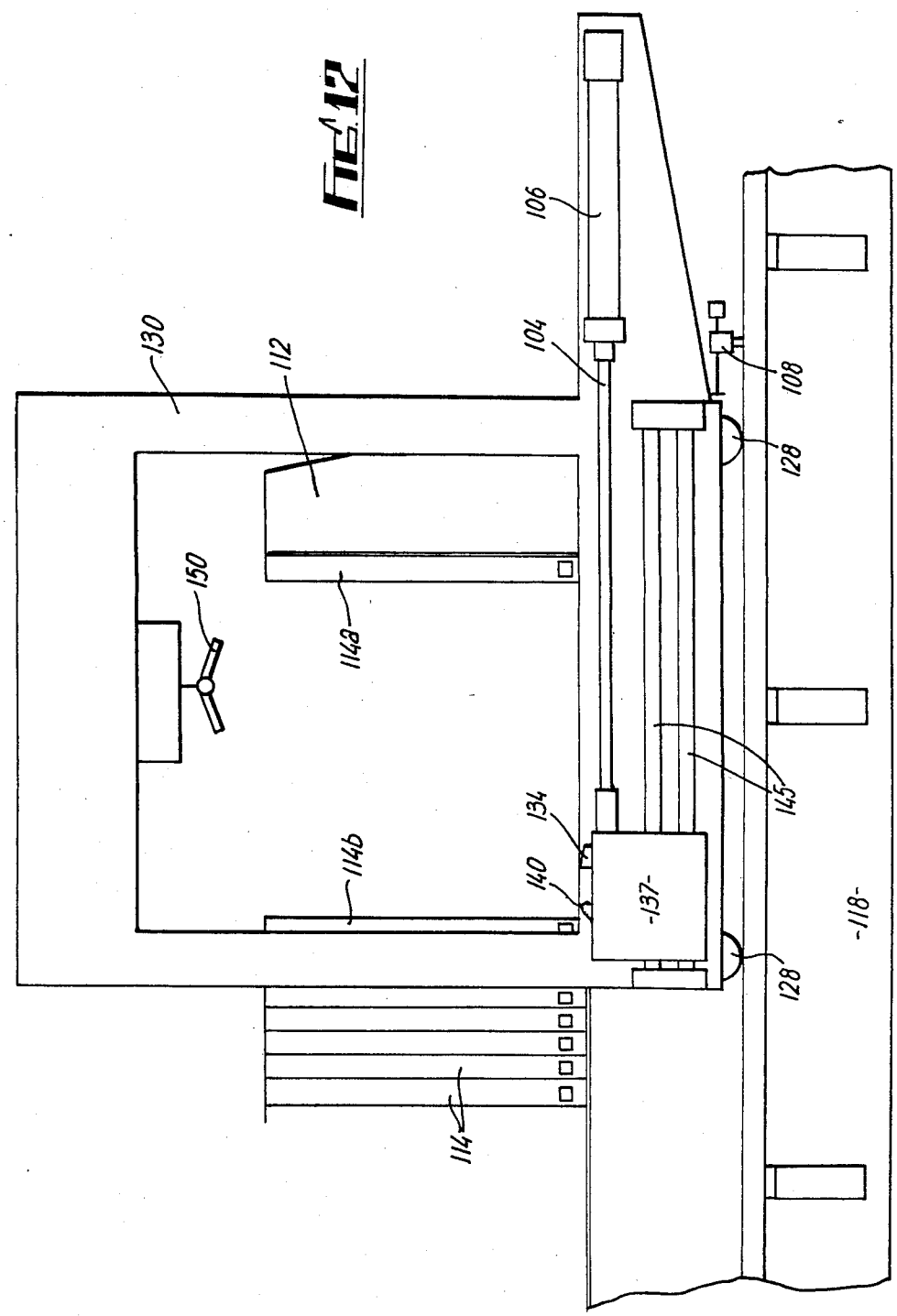
FIGS. 12 to 19 show diagrammatically a further plate filter press and a modified plate separating and moving device at various stages during its operation.
Figure 13:
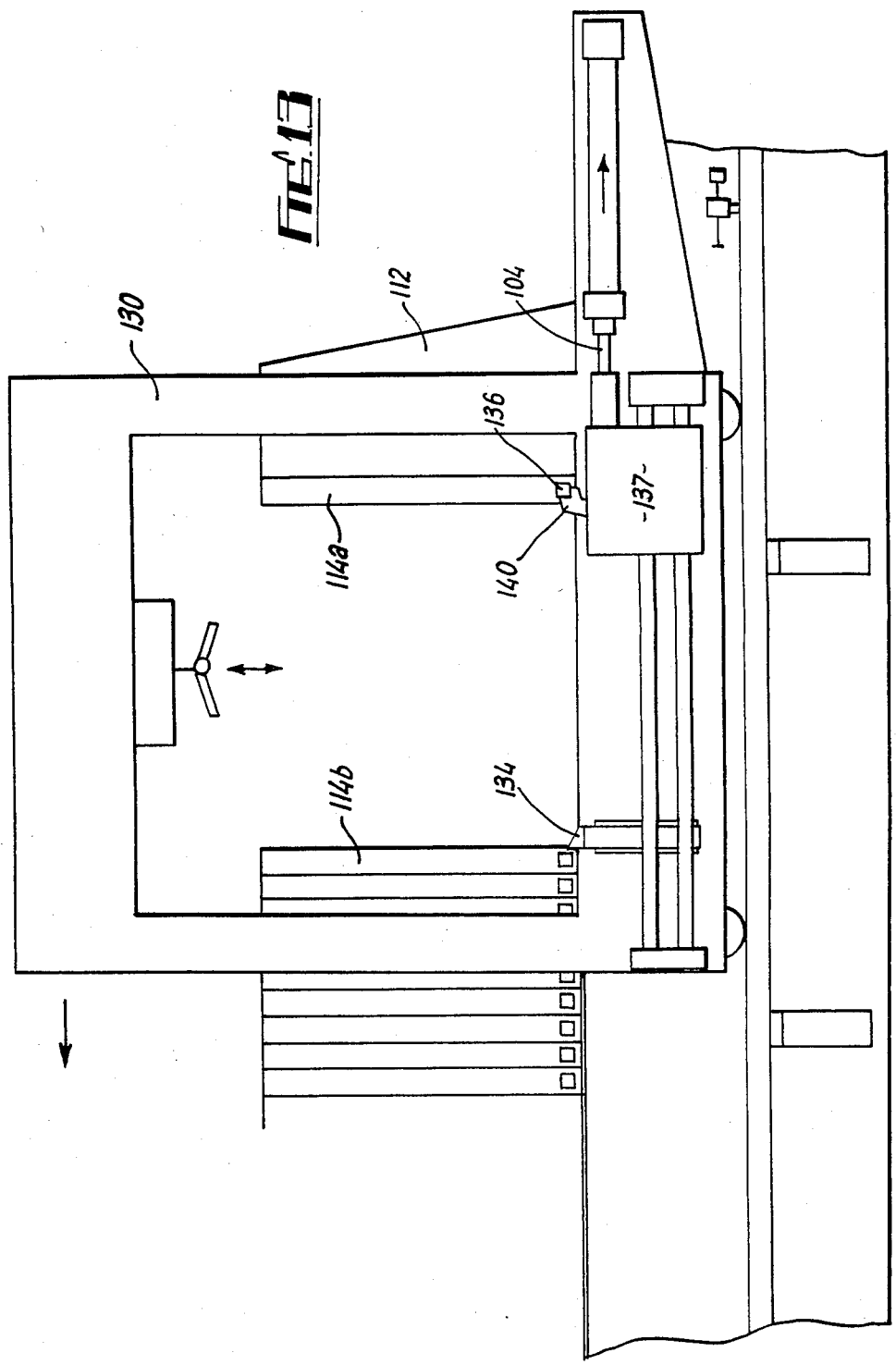

The tray separating device is supported by wheels 128 on side bars 118 and means (not shown) are provided for driving it from the fixed feed end 10 of the press to the position at the moving end 112 shown in FIG. 12. The device comprises a carriage 130 straddling the pack of filter plates 114 and has a latch 134 slidably mounted on each side, the latch being spring biassed in an upwards direction by springs (not shown).

Figure 20:
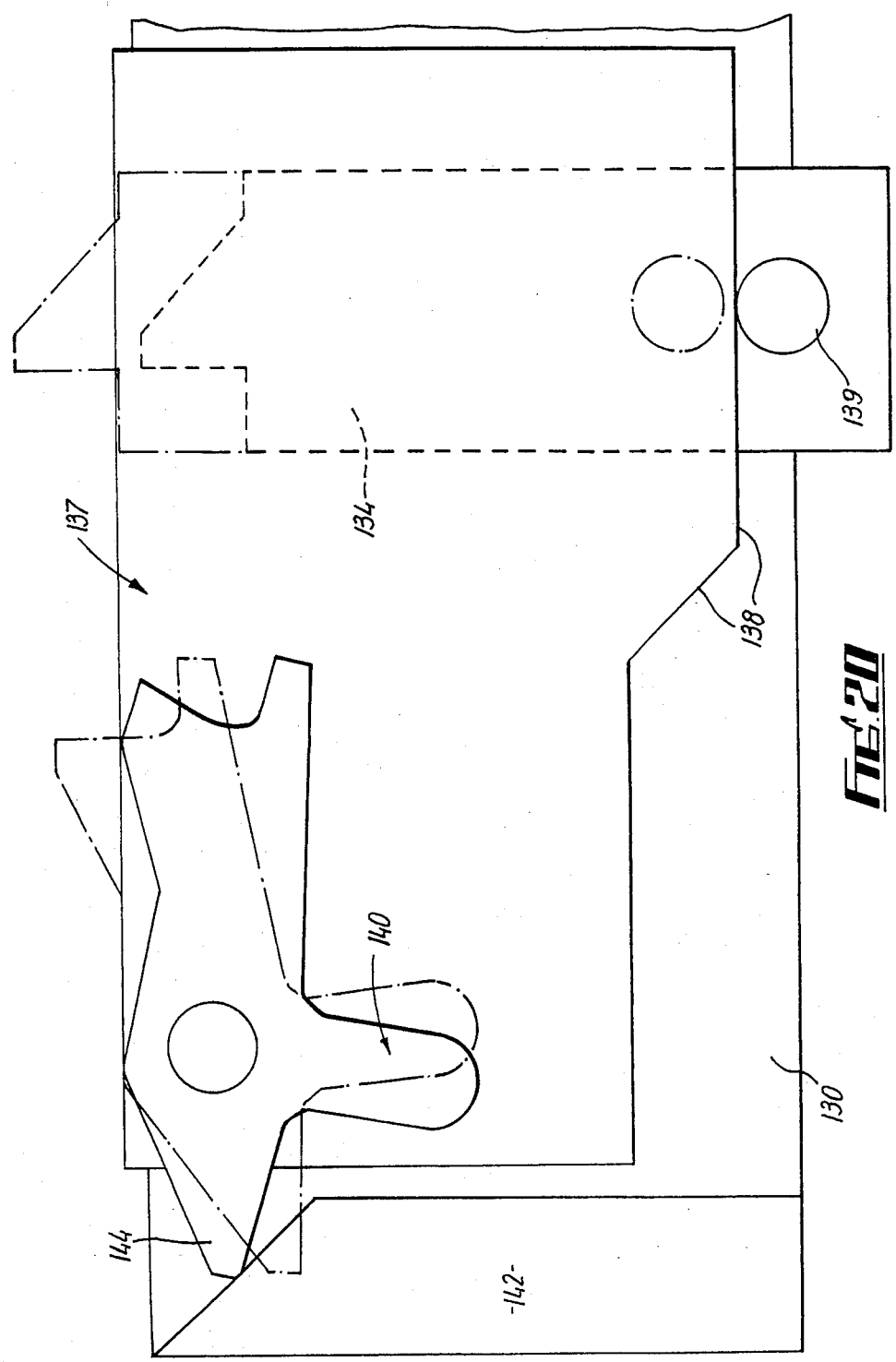
FIG. 20 shows diagrammatically a detail of the modified plate separating and moving device.

As can be more clearly seen in FIG. 20, a second member in the form of a pivotally mounted pawl 140 is pivotally mounted on a slide block 137 slidably mounted on guide means 145 on the side of the carriage 130. FIG. 20 shows that near the end of the carriage remote from the moving end of the press there is provided a lift cam 142 which is adapted to engage a follower 144 formed integrally with the latch 140 and adapted to pivot the pawl in a clockwise direction when the slide block is moved to a position in which the follower 144 abuts the cam 142. This clockwise pivotal movement takes place against the action of counter biassing means biassing the pawl in the anti-clockwise direction to its normal rest position shown in phantom lines in FIG. 20. FIG. 20 also shows that the slide block 137 is mounted on the side of the latch 134 remote from the pack of filter plates and that a cammed surface 138 is provided on the underside of the slide block 137 which co-acts with a roller 139 on the latch 134 to move it from its upper normal rest position, as shown in phantom lines in FIG. 20, to its retracted position as shown in full and dotted lines.

Figure 14:
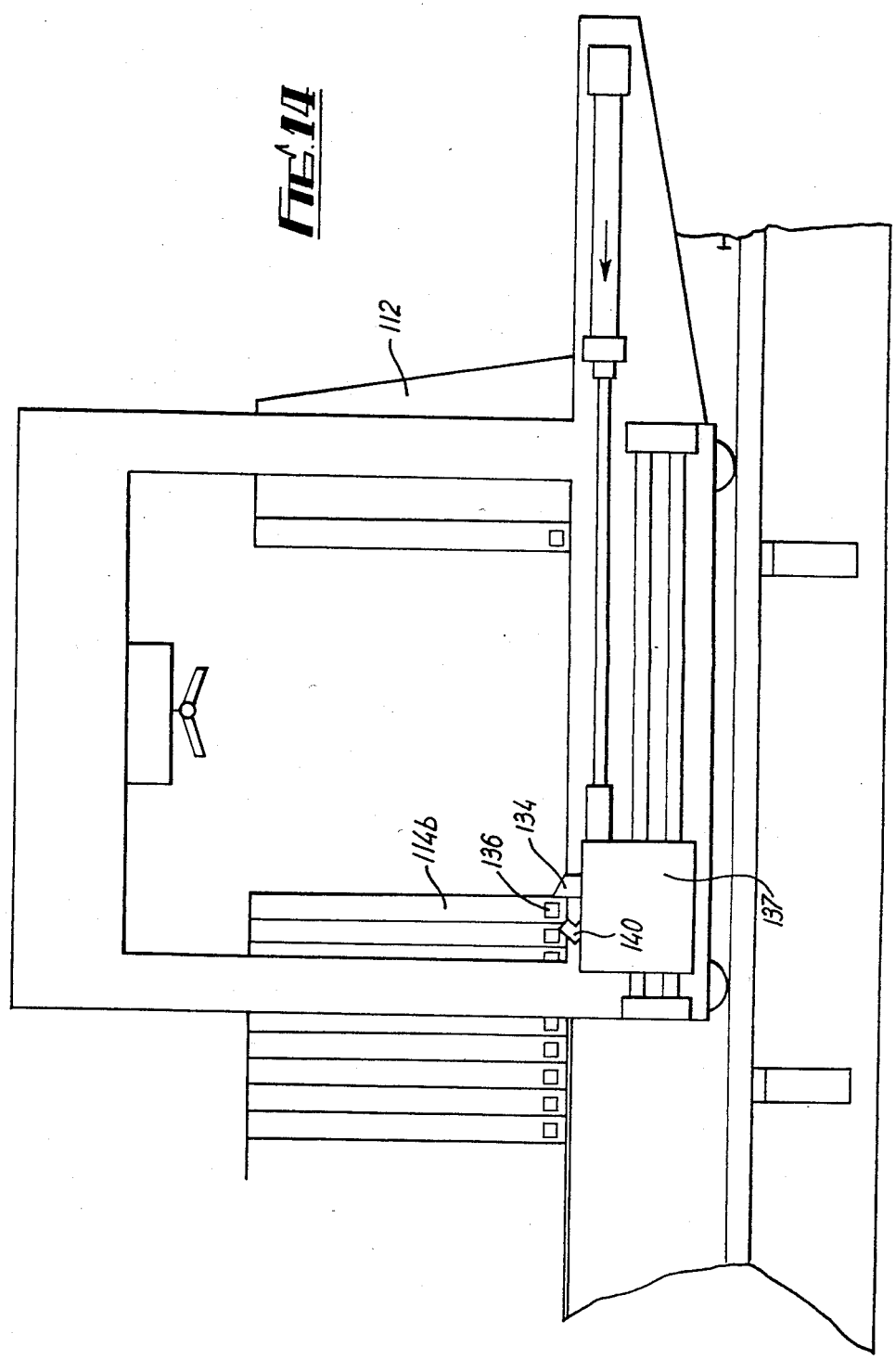

The modified plate separating arrangement operates in a manner which is generally similar to that described with reference to the embodiment shown in FIGS. 1 to 11. After a filtering operation has been completed the moving end 112 of the filter press is retracted from the remaining plates until a nominal 600 mm gap is formed between the moving end half plate 114a and the next plate of the pack 114b. At this instance the carriage 130 occupies the position shown in FIG. 12 in which it has been positioned earlier with the aid of a parking limit switch 108. The piston 104 of a piston and cylinder device 106 fixed to the side of the carriage 130 is then retracted to bring the slide block 137 to a position where the pawl 140 engages the handle 136 of the moving end half plate 114a. Continued retraction of the piston 104 causes a reactive movement of the carriage 130 to the right in FIG. 13 until the latch 135 is in its upper rest position as a result of its spring biassing engages the handle 136 of the endmost plate 114b of the pack. The build-up of pressure in the piston and cylinder device 106 is sensed and causes a reversal of the fluid supply thereto to eject the piston and move the slide block 137 to the left, as shown in FIG. 14, the pawl pivoting under the handle 136 of the endmost plate 114b as a result of its sloped leading face.

At this point the direction of movement of the slide block 137 is reversed and the piston 104 begins to retract. It will be realised by inspection of FIG. 20 that in its endmost position the cam surface 138 causes the latch 134 to retract under the handle 136 of plate 114b and the length of the cam surface 138 is carefully calculated so that the latch is retracted until the pawl 140 has picked up the plate 114b by its handle and has moved it past the latch towards the moving end 112 of the press.

Figure 15:
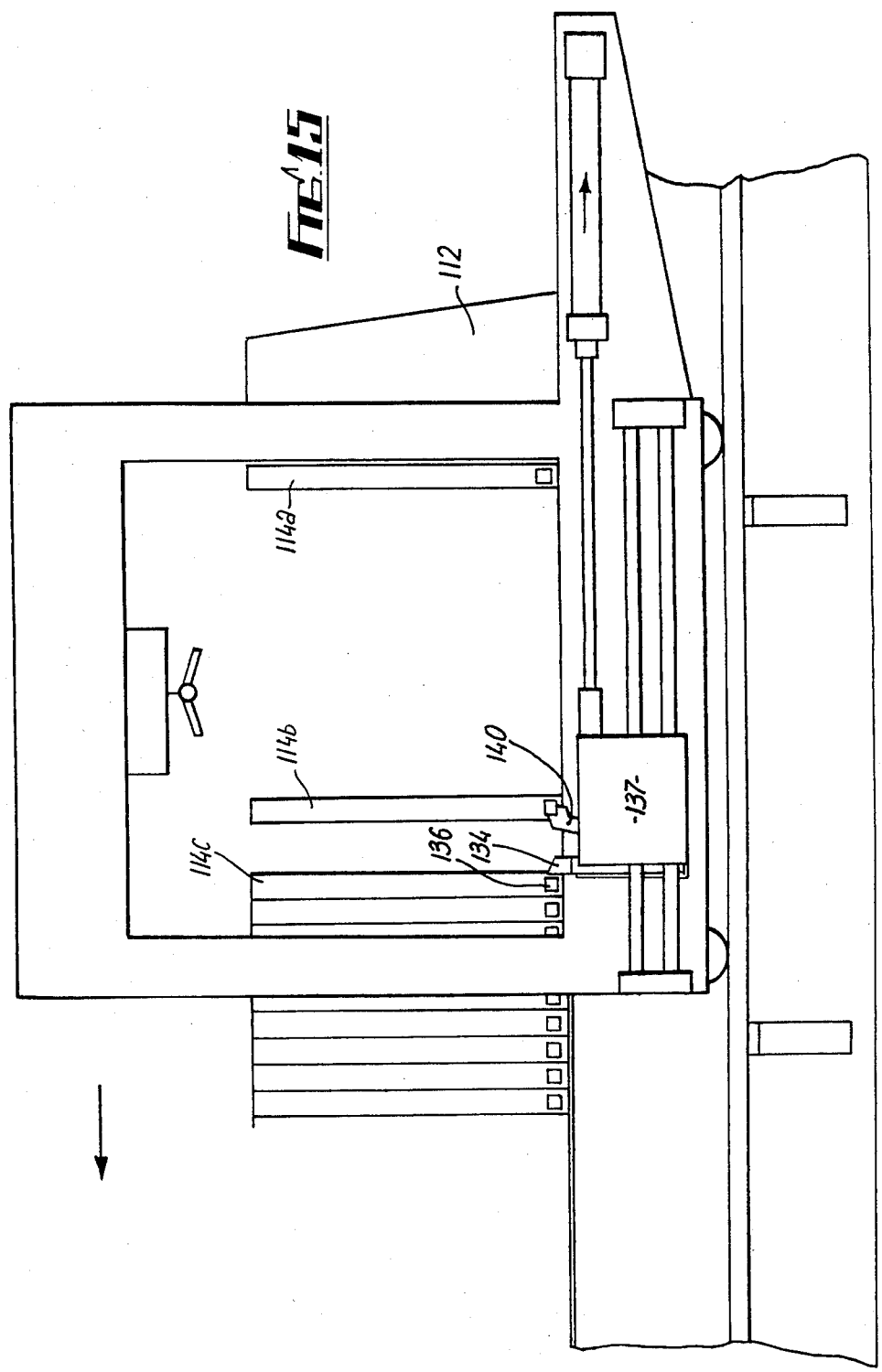
Figure 16:
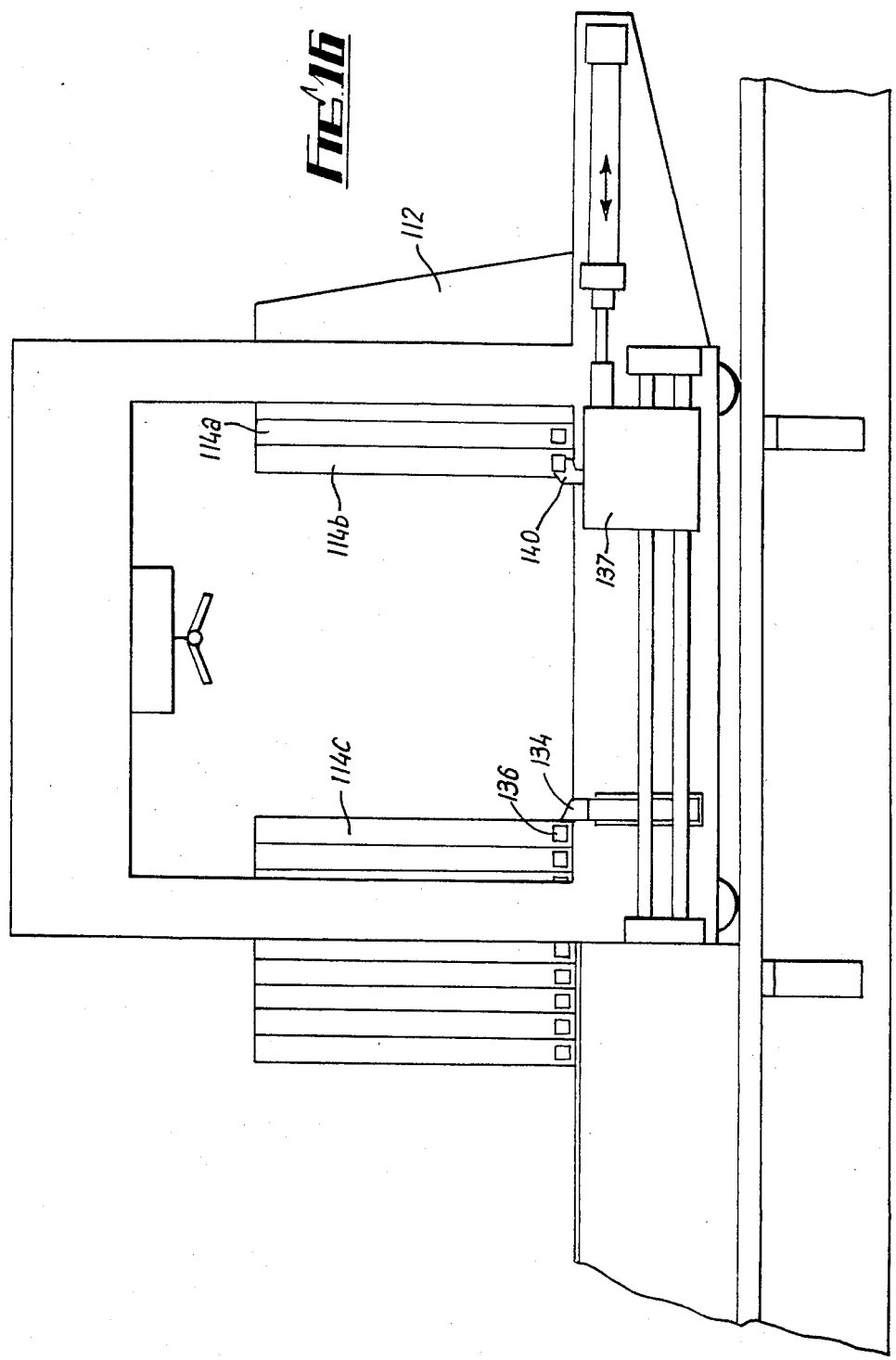
Figure 17:
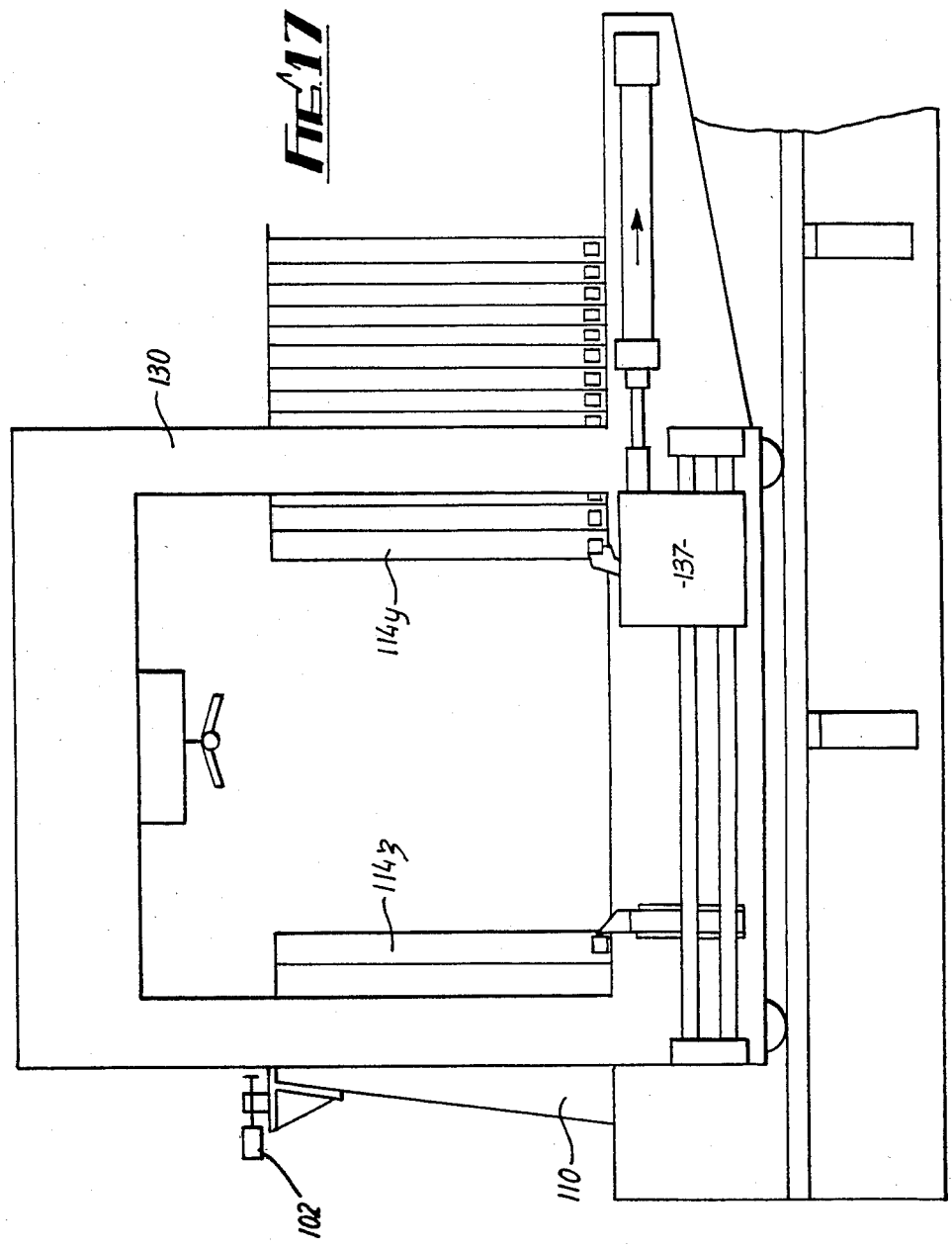
Figure 18:
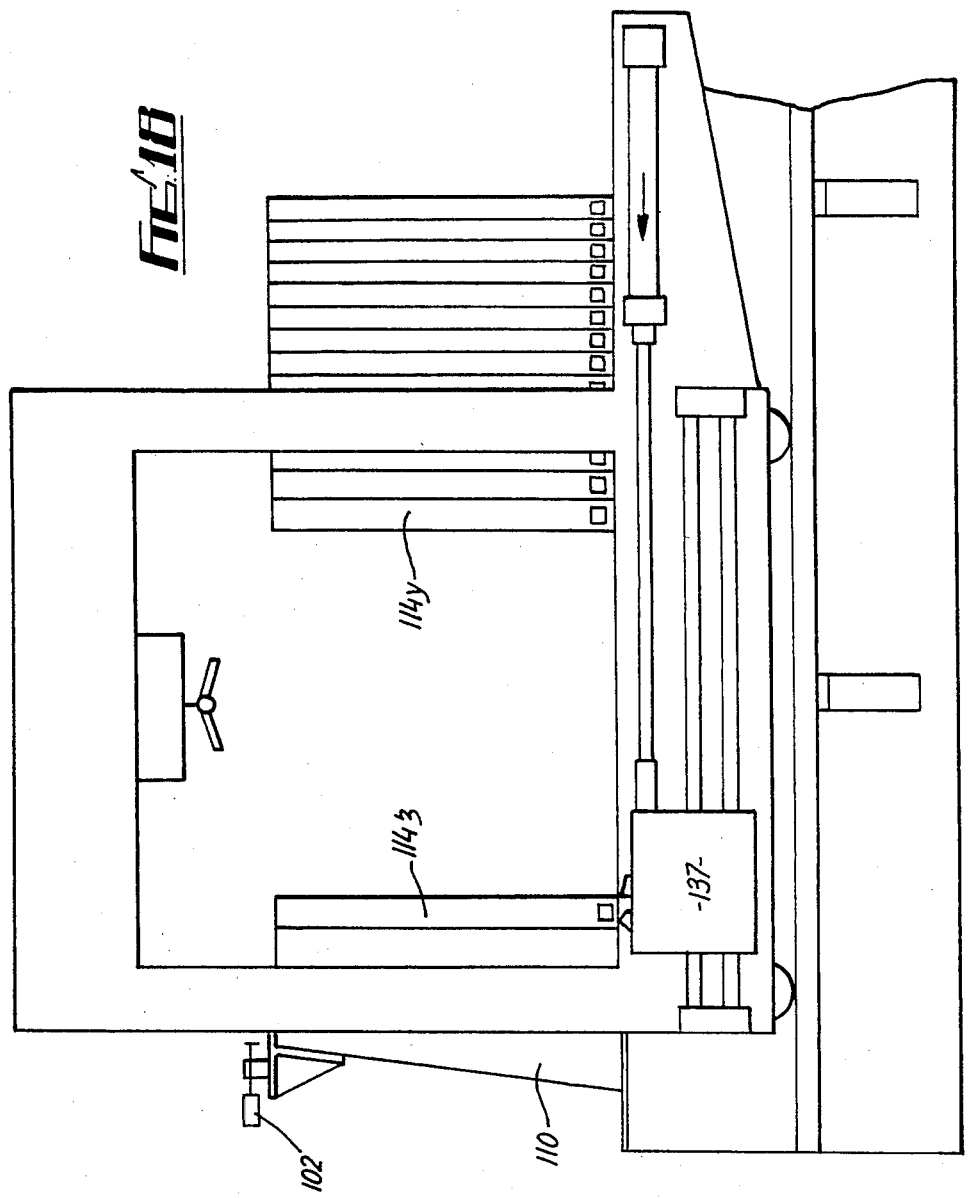
Figure 19:
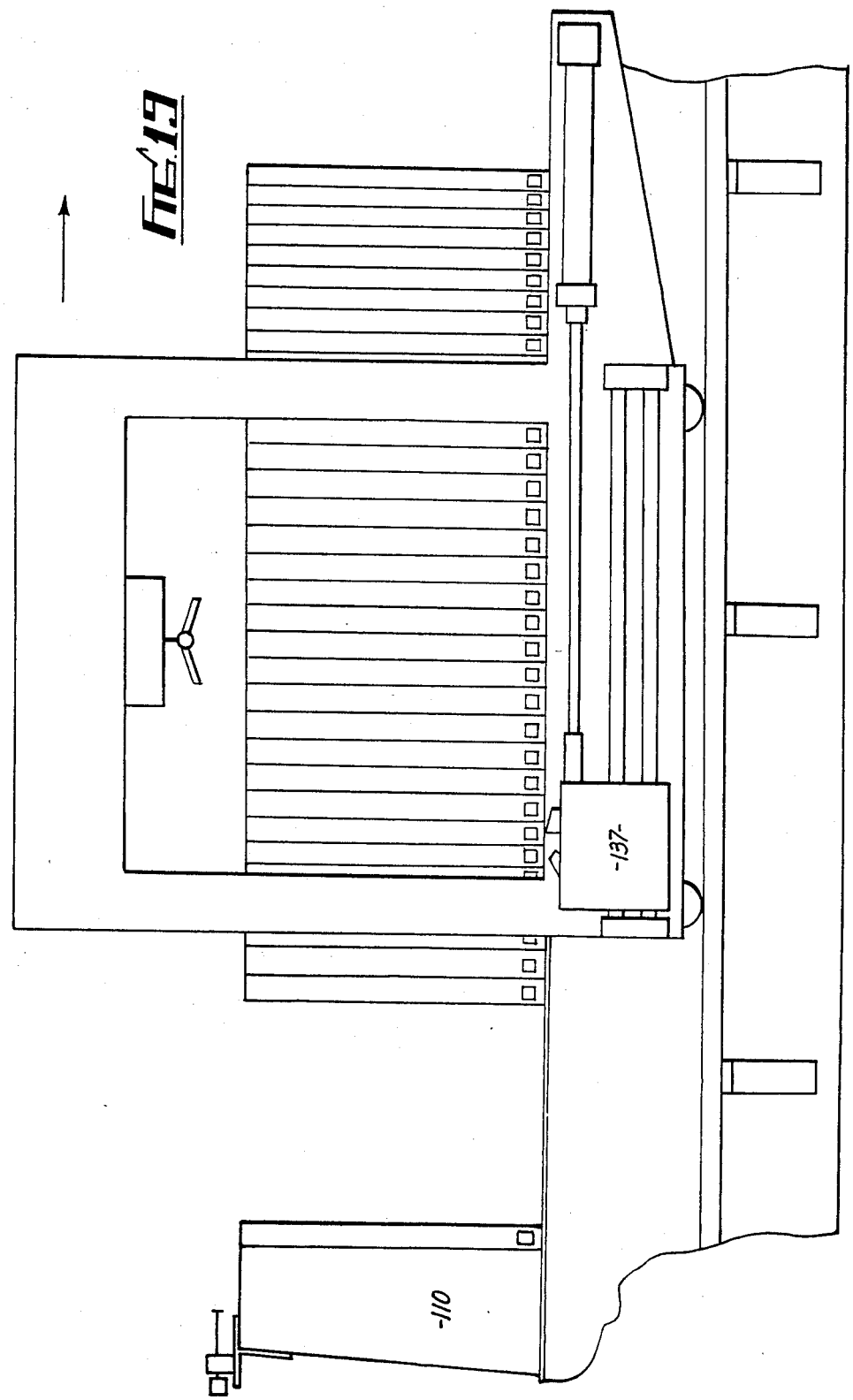

FIG. 15 shows that after a small movement of the side block 137 the latch 134 moves up to its normal rest position and continued movement of the slide block 137 causes a reactive movement of the carriage 130 to the left as shown in FIG. 15 until the latch 134 abuts the handle 136 of the next plate 114c of the pack. This results in the carriage being held against movement in a direction opposed to the movement of the separating plate which then continues its travel under the action of the side block 137 until it abuts the moving end half plate 114a. On reaching full separation, as shown in FIG. 16, the piston and cylinder 106 will automatically reverse and the plate separation sequence will continue in the manner shown in FIGS. 14 and 15 with a cloth washing operation being carried out at a rest condition when the plates are fully separated. When the last plate separation has taken place, as shown in FIG. 17, the slide block 137 will automatically return towards the fixed end half plate 114 and, on retracting the latch 134, will cause the carriage to move to the left against an end of travel limit switch 102. The limit switch 102 signals the pistion and cylinder device 106 to retain the piston in the fully extended position so that pawl and latch remain in their retracted positions (as shown in FIG. 18). The power drive to the carriage wheel 128 is then actuated (FIG. 19) to return the carriage to the position shown in FIG. 12 ready for the next plate separation operation to commence after a filtering operation has taken place.

I claim:

1. In a multiplate filter press having a stationary frame which extends along the longitudinal axis of a pack of filter plates mounted thereon and a filter plate separating device, wherein the improvement comprises:

said filter plate separating device including a carriage being movably mounted to said frame for movement along said stationary frame in the direction of the longitudinal axis of the pack of filter plates, a latch carried by the carriage for engaging a filter plate adjacent to the filter plate to be separated from the pack, a pawl for engaging the filter plate to be separated from the pack, and separating means being movably mounted on the carriage, the pawl being mounted on the separating means, and the separating means including means for moving it with respect to the carriage for moving the pawl away from the latch and for separating the filter plate to be separated from the pack.

2. A device as claimed in claim 1, wherein the improvement further comprises: said means for moving the separating means being a hydraulic piston having a cylinder device with a reciprocable member, said piston being mounted on the carriage and operatively attached to the separating means, a hydraulic pressure sensing means in a fluid supply to said cylinder device, fluid supply direction reversing means in said supply being responsive to said pressure sensing means so that when the separating means advances to such a position that its pawl pushes a separated plate against a previously separated plate, an increased pressure is sensed and the direction of movement of the separating means is reversed.

3. A device as claimed in claim 2, wherein the improvement further comprises:

a limit switch operable by the pawl when the pawl has moved over the next plate to be separated, actuation means operable by the limit switch and operative on the fluid supply reversing means to reverse the direction of supply so that the direction of movement of the separating means is reversed, latch engagement means movable with which operatively moves the latch out of engagement with the outer plate of the pack as the carriage moves towards a remaining pack of plates and into engagement with the plate next to the outer plate of the remaining pack of plates.

* * * * *